(12) United States Patent
Mager

(10) Patent No.: US 7,095,986 B2
(45) Date of Patent: Aug. 22, 2006

(54) INTERCHANGEABLE COVERING WITH KEYS FOR PERSONALIZING MOBILE ELECTRONIC COMMUNICATION DEVICES

(75) Inventor: Gary N. Mager, Seattle, WA (US)

(73) Assignee: Wildseed Ltd., Seattle, WA (US)

( * ) Notice: Subject to any disclaimer, the term of this patent is extended or adjusted under 35 U.S.C. 154(b) by 734 days.

(21) Appl. No.: 09/908,213

(22) Filed: Jul. 17, 2001

(65) Prior Publication Data
US 2003/0017839 A1 Jan. 23, 2003

Related U.S. Application Data

(60) Provisional application No. 60/306,326, filed on Jul. 17, 2001.

(51) Int. Cl.
H04B 1/38 (2006.01)
H04M 1/00 (2006.01)

(52) U.S. Cl. ............... 455/90.3; 455/550.1; 455/575.1; 379/433.11

(58) Field of Classification Search ...... 455/90.1–90.3, 455/550.1, 558, 418, 419, 420, 575.1–575.8, 455/556.1; 379/433.11, 428.01, 429, 433.01, 379/434, 433.12
See application file for complete search history.

(56) References Cited

U.S. PATENT DOCUMENTS

| 4,292,481 | A | | 9/1981 | Barnes et al. |
|---|---|---|---|---|
| 5,303,291 | A | | 4/1994 | Takagi et al. |
| 5,383,091 | A | * | 1/1995 | Snell ........................... 361/679 |
| 5,610,971 | A | * | 3/1997 | Vandivier ................ 455/569.2 |
| 5,768,370 | A | | 6/1998 | Maatta et al. |
| 5,786,106 | A | | 7/1998 | Armani |
| 5,786,789 | A | | 7/1998 | Janky |
| 5,822,703 | A | * | 10/1998 | Araki .......................... 455/564 |
| 5,848,152 | A | * | 12/1998 | Slipy et al. ............ 379/433.13 |
| 5,857,157 | A | | 1/1999 | Shindo |
| 5,911,121 | A | * | 6/1999 | Andrews ..................... 455/418 |
| 5,924,044 | A | | 7/1999 | Vannatta et al. |
| 5,953,674 | A | * | 9/1999 | Hutchison, IV ............. 455/557 |
| 5,982,881 | A | | 11/1999 | Mischenko |
| 6,084,962 | A | | 7/2000 | Plenge |
| 6,092,133 | A | | 7/2000 | Erola et al. |
| 6,154,788 | A | | 11/2000 | Robinson et al. |
| 6,179,649 | B1 | * | 1/2001 | An ............................. 439/500 |
| 6,219,560 | B1 | | 4/2001 | Erkkila et al. |
| 6,349,220 | B1 | * | 2/2002 | Prior et al. .................. 455/566 |
| 6,487,397 | B1 | * | 11/2002 | Fuhrmann et al. ......... 455/90.1 |

(Continued)

FOREIGN PATENT DOCUMENTS

EP 1091540 A 11/2001

(Continued)

*Primary Examiner*—Charles N. Appiah
(74) *Attorney, Agent, or Firm*—Schwabe, Williamson & Wyatt, P.C.

(57) ABSTRACT

An interchangeable covering for a mobile electronic communication device (mobile device) includes an electronic component having a switch unit, a personalization unit and an interface unit. The switch unit includes key(s) that are accessible to the user when the covering is fitted to the mobile device. The personalization unit stores information such as music data files, audio ring files, screen animation files, data files (e.g., telephone numbers, email addresses, URLs, radio channels, etc.) and/or instructions that can be executed by a processor in the mobile device. The user can use the switch unit to access the information in the personalization unit. The personalization unit interacts with the electronics of the mobile device via the interface unit.

50 Claims, 6 Drawing Sheets

U.S. PATENT DOCUMENTS

| | | |
|---|---|---|
| 6,594,472 B1 * | 7/2003 | Curtis et al. ............. 455/575.8 |
| 2001/0044317 A1 * | 11/2001 | Prior et al. |
| 2002/0030103 A1 | 3/2002 | Wycherley et al. |
| 2002/0037738 A1 * | 3/2002 | Wycherley et al. ...... 455/550.1 |
| 2002/0098876 A1 | 7/2002 | Engstrom et al. |

FOREIGN PATENT DOCUMENTS

| | | |
|---|---|---|
| GB | 2 305 810 A * | 4/1997 |
| GB | 2 362 071 A * | 11/2001 |
| WO | WO 97/32424 A1 * | 9/1997 |

* cited by examiner

INTERCHANGEABLE COVERING WITH KEYS FOR PERSONALIZING MOBILE ELECTRONIC COMMUNICATION DEVICES

CROSS-REFERENCE TO RELATED APPLICATIONS

This application is related to co-pending U.S. Provisional Patent Application No. 60/306,326 entitled "Personalizing Electronic Devices and Smart Covering", by G. Eric Engstrom filed on Jul. 17, 2001.

TECHNICAL FIELD

This disclosure relates generally to mobile electronic communication devices, and in particular but not exclusively, relates to coverings for mobile electronic communication devices.

BACKGROUND

Mobile electronic communication devices such as, for example, cellular telephones, pagers, hand-held computers and personal digital assistants are generally sold to consumers with a standard housing that does not include any significant functionality other than as a container that houses the internal electronics and perhaps some ornamental designs and/or markings that label buttons or indicate trademarks or trade names.

In some cases, a user may be able to change the external appearance of some mobile electronic communication devices through the use of interchangeable faceplates that form part of the housing. These faceplates do not have any significant functionality beyond its ornamental design (including color, texture, and contours). These faceplates are typically formed from molded plastic with holes or openings to accommodate user-operation of buttons, displays, microphones and speakers of the mobile electronic communication devices. Such faceplates do not otherwise interact with the electronics of the mobile electronic communication device.

SUMMARY

In accordance with aspects of the present invention, an interchangeable covering for a mobile electronic communication device is provided. In one aspect, the interchangeable covering includes an electronic component having a switch unit, a personalization unit and an interface unit. In one embodiment, the switch unit is implemented with buttons or keys that are accessible to the user when the covering is fitted to the mobile electronic communication device. In this embodiment, the personalization unit includes a memory that stores personalization information. For example, the personalization information can include music data files, audio ring files, screen animation files, data files (e.g., telephone numbers, email addresses, URLs, radio channels, credit card numbers, etc.) and/or commands or instructions that can be executed by a processor in the mobile electronic communication device and/or in the covering itself. The user can use the switch unit to access or use (e.g., execute commands or instructions) the information in the personalization unit. The personalization unit interacts with the electronics of the mobile electronic communication device via the interface unit. This aspect advantageously allows a user to add new features to the user's currently owned mobile electronic communication device in a relatively inexpensive manner.

In another aspect of the present invention, the electronic component of the interchangeable covering provides functionality that is substantially independent of the electronics of the mobile electronic communication device. For example, in one embodiment, the electronic component also includes an audio unit that allows the user to play music or transmit other audio signals (e.g., short entertaining message, wolf whistle, or amusing or embarrassing sound effect, etc.) associated with information in the personalization unit. The electronic component may be configured to receive power from the power source in the mobile electronic communication device, but does not otherwise need to use its other components.

In another aspect of the present invention, the electronic component of the interchangeable covering interoperates with components of the mobile electronic communication device. For example, by pressing a button (or sequence of buttons) on the interchangeable covering, the user may provide a music data file stored in the personalization unit to the mobile electronic communication device, which then plays the music data file using its own audio unit. In another example, by pressing a button (or sequence of buttons) on the interchangeable covering the user may provide a telephone number stored in the personalization unit to the mobile electronic communication device along with a command to dial the telephone number.

In another aspect of the present invention, the interchangeable coverings are used as part of a method of doing business. In one embodiment, the information in the personalization unit may include information that is related to a selected theme such as, for example, an event, activity, business, promotion, product, etc. For example, a radio station may sponsor or distribute interchangeable coverings loaded with information related to concerts, contests, merchandise, music samples, video samples, animations, information hotlines, etc. that are related to the radio station's business and music format.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of a system and method for personalizing a mobile electronic communication device are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
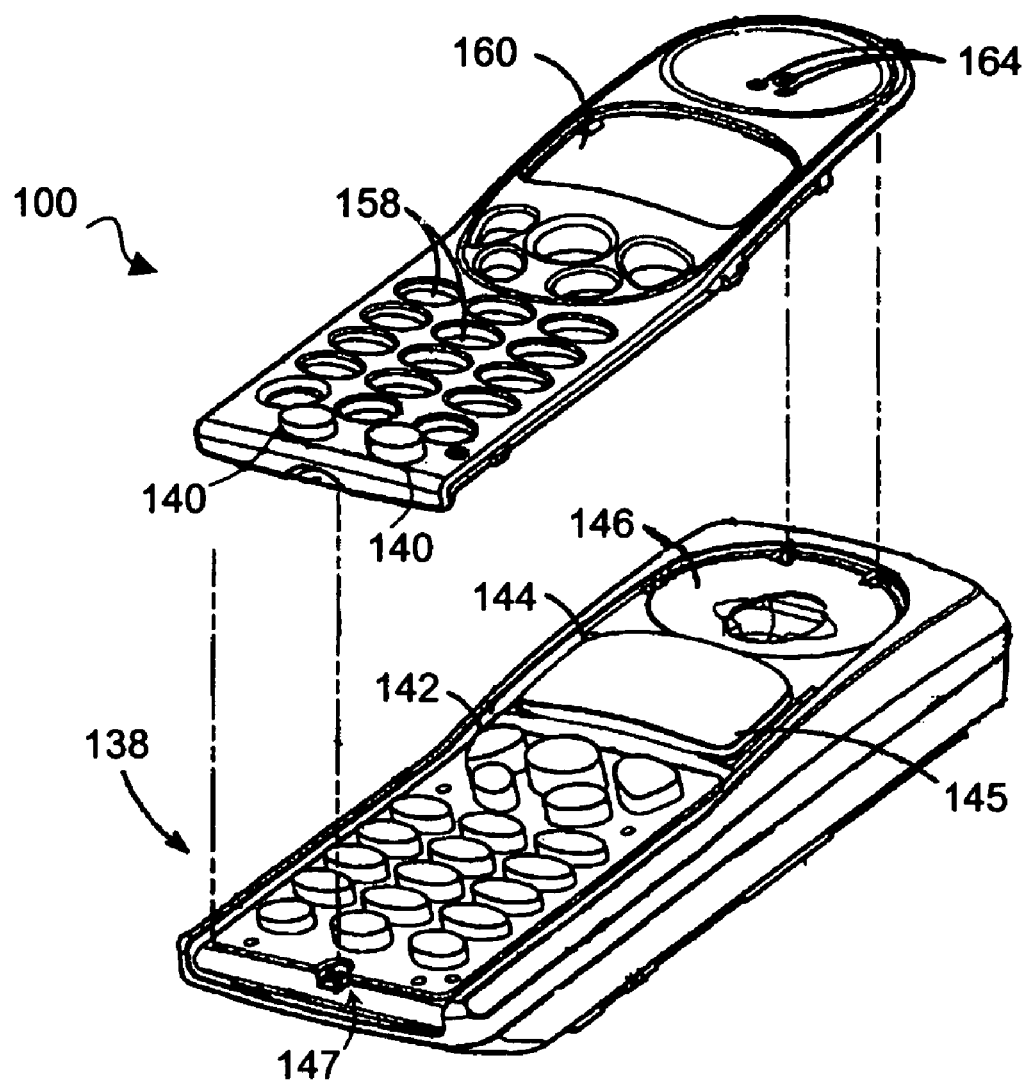
FIG. 1 is a diagram illustrating an exploded perspective view of an interchangeable covering as used with a mobile electronic communication device, according to one embodiment of the present invention.

FIG. 1 illustrates an interchangeable covering 100 as used with a mobile electronic communication device 138, according to one embodiment of the present invention. In this embodiment, interchangeable covering 100 is implemented as the front covering (i.e., "front" when viewing the face or display) for essentially the entire front side of mobile electronic communication device 138. This embodiment of interchangeable covering 100 is implemented with a rigid material such as, for example, plastic, metal, wood, paper, laminates or suitable combinations of these materials. A user of this embodiment of interchangeable covering 100 can snap fit the covering onto a base or framework of mobile electronic communication device 138 to securely but detachably attach interchangeable covering 100 to the framework of mobile electronic communication device 138. Of course, other embodiments may use different mechanisms to interchangeably attach interchangeable covering 100 to mobile electronic device 138.

In other embodiments, interchangeable covering 100 may cover a portion of the front side of mobile electronic communication device 138. In still other embodiments, interchangeable covering 100 can serve as the back covering for essentially the entire back side of mobile electronic communication device 138, or a portion of the back side, or a combination of front and back coverings. In still other embodiments, interchangeable covering 100 may be implemented as a conformal elastomeric membrane or covering that is fitted around the mobile electronic communication device 138 that has a fixed covering. The term "fixed" is used in this context to mean that the covering is not intended to be removed once attached. A fixed covering may be attached by adhesive, screws, press fit, etc.

In accordance with the present invention, interchangeable covering 100 includes an electronic component. In particular, the electronic component includes one or more buttons or buttons 140 that allow the user to operate the electronic component and/or interact with mobile electronic communication device 138. In the embodiment shown in FIG. 1, two buttons 140 are located near the bottom of interchangeable covering 100. Buttons 140 are part of a switch unit (shown in FIG. 3) embedded in or attached to the interior surface of interchangeable cover 100. Of course, in other embodiments, buttons 140 may be arranged at any suitable location or locations on interchangeable covering 100. For example, interchangeable covering 100 may be formed with sides wide enough to hold one or more buttons 140 that extend laterally outward. A user can actuate buttons 140 using a thumb or a fingertip. For example, these lateral buttons would tend to be easily accessible and operated using the thumb or fingers (which would wrap around the back of mobile electronic communication device 138) when holding mobile electronic communication device 138 in the palm.

Typically, mobile electronic communication device 138 includes keys 142 and a display 144 (e.g., a liquid crystal display) by which the user operates the device. Mobile electronic communication device 138 may also include a transparent shield 145 to protect display 144. In addition, mobile electronic communication device 138 typically includes an earpiece mounting 146 to hold an audio transducer (not shown) to transmit audio signals (e.g., voice signals).

In another aspect of the present invention, mobile electronic communication device 138 includes a fixed back covering (not shown) with a fitting for at least one key. In some embodiments, the fixed back covering may partially cover the back side of mobile electronic communication device. The term fitting is used in this context to refer to either an opening to receive a key integrated with mobile electronic device 138, or mounting for a key that is integrated with the fixed back covering (e.g., a membrane type key). In one exemplary embodiment, the key may be an ON/OFF key. This configuration can be advantageous in that the user typically uses the ON/OFF key to begin and end an operating session and does not need to view the display to facilitate the operation. This can advantageously free up valuable surface area on the front side of the mobile electronic device. Of course, in other embodiments, the key or keys on the back side of the mobile electronic communication device may be used for other functions. This aspect of the present invention can be used together with interchangeable covering 100.

Interchangeable covering 100 includes openings 158 and 160 through which keys 142 and transparent shield 145 extend when interchangeable covering 100 is fitted to mobile electronic communication device 138. In addition, interchangeable covering 100 includes openings 164 to improve audio signal transmission from the audio transducer to the user.

As previously mentioned, interchangeable covering 100 includes an electronic component. In one embodiment, the electronic component is embedded in the material of interchangeable covering 100 and is not visible to the user except for buttons 140 and electrical contacts (shown in FIG. 2) that electrically connect the electronic component to the electronics of mobile electronic communication device 138. In the embodiment of FIG. 1, mobile electronic communication device 138 includes electrical contacts 147 that are arranged to physically contact the electrical contacts (see FIG. 2) of interchangeable cover 100 when interchangeable cover 100 is attached to mobile electronic communication device 138. Via these electrical contacts, the electronic component of interchangeable cover 100 can interact with the electronics of mobile electronic communication device 138.

In one embodiment, the electronic component stores personalization information. For example, the personalization information can include music data files, audio ring data files, screen animation data files, alphanumeric data files (e.g., telephone numbers, email addresses, universal resource locators (URLs), radio channels, credit card numbers, etc.) and/or commands or instructions that can be executed by a processor in mobile electronic communication device 138 and/or in the electronic component itself. The user can use buttons 140 to access or use (e.g., execute commands or instructions) the personalization information in the electronic component. This aspect advantageously allows a user to add new features to mobile electronic communication device 138 in a relatively inexpensive manner. In addition, this aspect can provide buttons 140 that are closely linked to specific data in the personalization information, thereby simplifying the process by which a user can access or use the personalization information.

Figure 2:
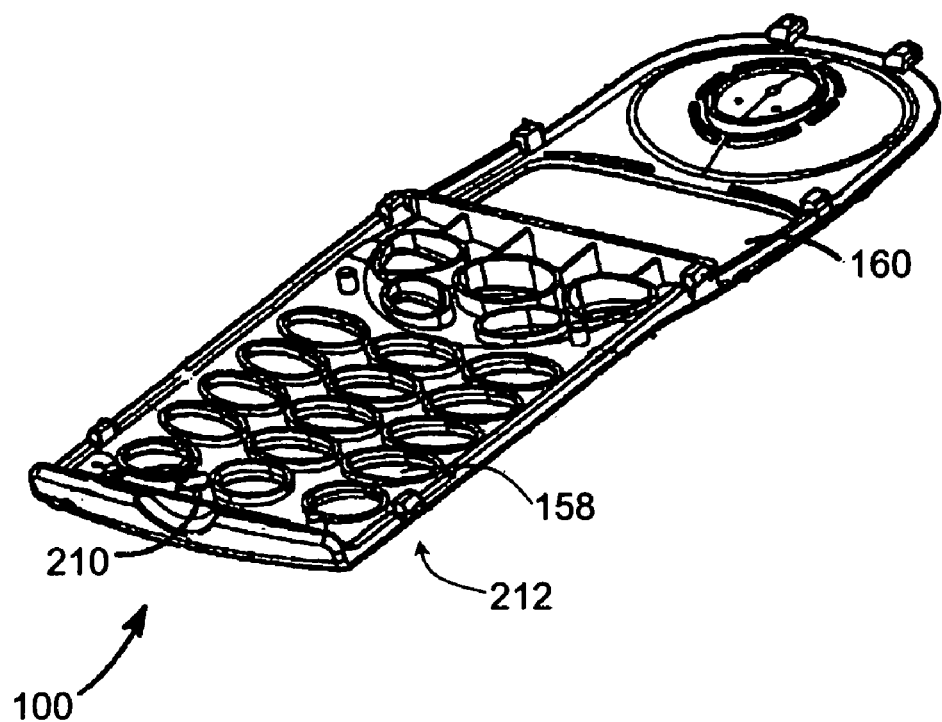
FIG. 2 is a diagram illustrating the interior surface of the interchangeable covering depicted in FIG. 1, according to one embodiment of the present invention.
Figure 2A:
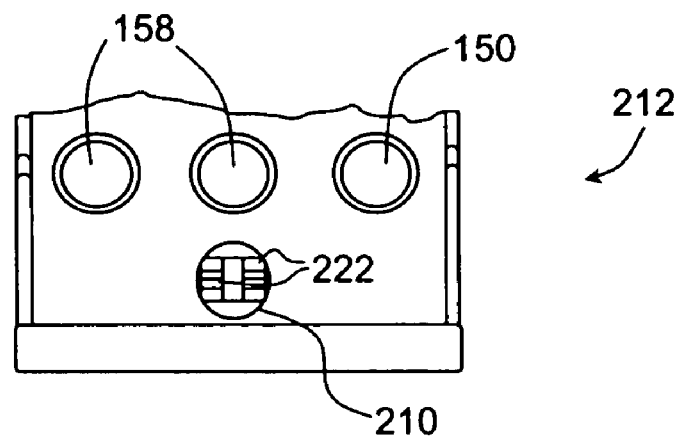
FIG. 2A is a diagram illustrating the interior surface of the lower portion of the interchangeable covering depicted in FIG. 2.

FIG. 2 illustrates (not to scale) the interior surface of interchangeable covering 100 (FIG. 1). In accordance with the present invention, interchangeable covering 100 includes a connector element 210 located on a lower portion 212 of the covering. An enlarged view of lower portion 212 is illustrated in FIG. 2A. As shown in FIG. 2A, connector element 210 includes electrical contacts 222 arranged to come into physical contact with electrical contacts 147 (FIG. 1) of mobile electronic communication device 138 when fitted with interchangeable covering 100. Although not visible in FIGS. 1 and 2, other portions of the electronic component are embedded in interchangeable covering 100. In other embodiments, portions of the electronic component (e.g., an integrated circuit device) may be mounted to the interior surface of interchangeable covering 100. One embodiment of the electronic component is described below. Electrical contacts 222 can be used to electrically connect electronic component 300 to power and signal lines of mobile electronic communication device 138.

Figure 3:
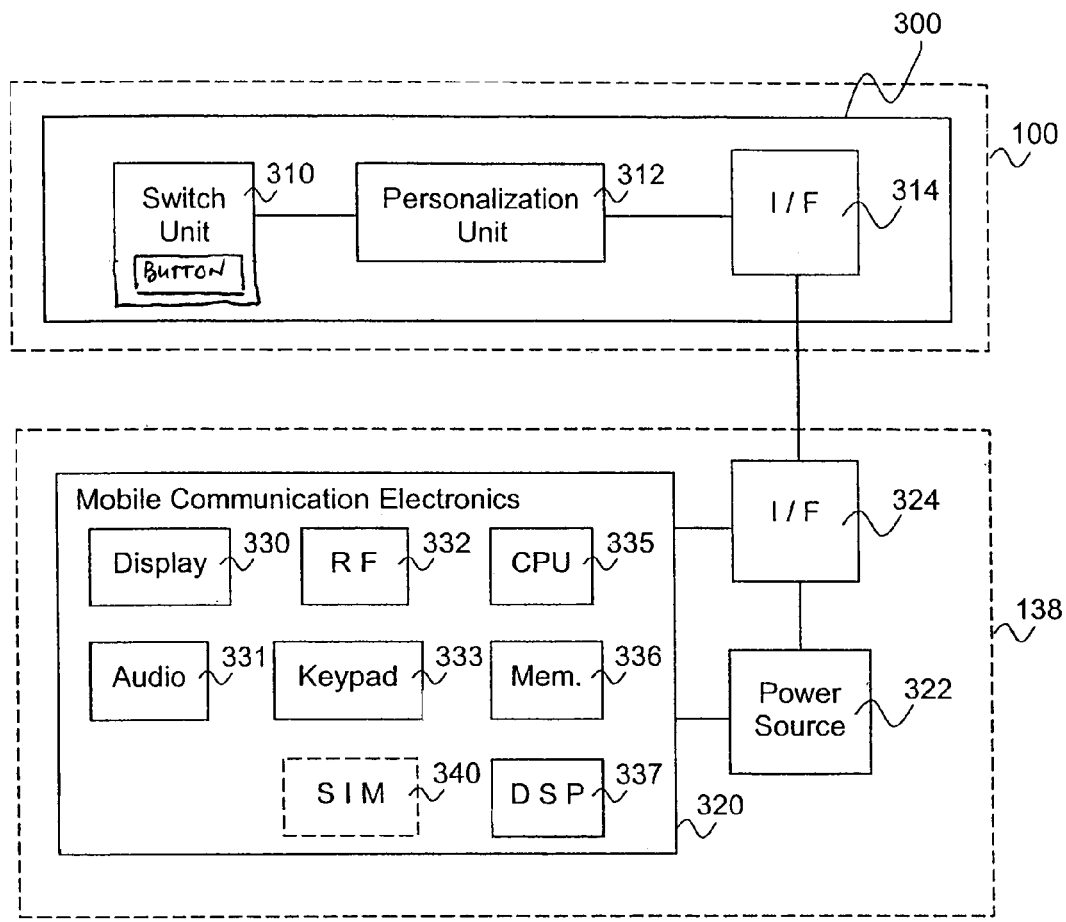
FIG. 3 is a simplified block diagram illustrating an electronic component of the interchangeable covering depicted in FIG. 1, according to one embodiment of the present invention.

FIG. 3 illustrates a simplified block diagram of an electronic component 300 attached to or embedded in interchangeable covering 100, according to one embodiment of the present invention. In this embodiment, electronic component 300 includes a switch unit 310, a personalization unit 312 and an interface unit 314. Switch unit 130 includes buttons, such as buttons 140 (FIG. 1) that are electrically connected to personalization unit 312. One embodiment of personalization unit 312 (described below in conjunction with FIG. 5) is implemented in the form of an integrated circuit that includes memory and associated addressing circuitry that can store the aforementioned personalization information. In other embodiments, personalization unit 312 and interface unit 314 may be implemented on a single circuit device, or as separate sub components, or each with component circuitry distributed over two or more circuit devices. In light of the present disclosure, those skilled in the art will be able to design other hardware implementations without undue experimentation.

Interface unit 314 serves as a transceiver to transmit signals from personalization unit 312 to mobile electronic communication device 138 and vice versa. For example, interface unit 314 may be implemented with a universal asynchronous receiver/transmitter (UART) device. In an alternative embodiment, interface unit 314 may be implemented with a low power "blue tooth" transceiver for wirelessly communicating with mobile electronic communication device 138. In this alternative embodiment, electrical contacts 147 and 222 may be simplified to connect to the power source of mobile electronic communication device 138. Electrical contacts 147 and 222 may be eliminated in embodiments in which interchangeable covering 100 includes its own power source.

Although mobile electronic communication devices are well known, the following description of various components of mobile electronic communication device 138 can help in understanding some of the features of the present invention. In one application, mobile electronic communication device 138 includes mobile communication electronics 320, a power source 322 and an interface unit 324. Mobile communication electronics 320 can include a display 330 (e.g., a LCD), an audio unit 331 (e.g., a speaker), a radio frequency (RF) unit 332 (i.e., a RF transceiver, antenna, etc.), and a keypad 333. In addition, mobile communication electronics can include a central processing unit (CPU) 335 (or other processor or controller that can execute software/firmware programs), memory 336 (e.g., random access memory, non-volatile memory. etc.) accessible by CPU 335, and a digital signal processor (DSP) 337 to process signals to and from RF unit 332 (e.g., modulate and demodulate signals). In addition, some mobile electronic communication devices can include a subscriber identity module (SIM).

Referring to FIG. 3 and the flow diagram of FIG. 4, one embodiment of electronic component 300 operates as follows. Operation can begin when interchangeable covering 100 is attached to mobile electronic communication device 138. In a block 402, the user enables electronic component 300. In one embodiment, attaching interchangeable covering 100 to mobile electronic communication device 138 automatically enables electronic component 300. In other embodiments, the user may actuate an ON/OFF button on switch unit 310 to enable electronic component 300.

In an optional block 404, electronic component 300 and mobile electronic communication device 138 perform a "hand shaking" or initialization operation in which information is exchanged to verify that electronic component 300 is interoperable with mobile electronic communication device 138. Block 404 may include an authentication or verification procedure to add security. For example, in one embodiment, the user may be prompted to enter a password or security code via keypad 333 of mobile electronic communication device 138. In this exemplary embodiment, mobile electronic communication device 138 and/or electronic component 300 would only allow the user to access to the personalization information if the user enters a valid password. Although not shown in FIG. 4, if these elements are not interoperable, operation terminates.

In an optional block 405, electronic component 300 can be configured to determine whether the user has actuated the optional ON/OFF button of switch unit 310 to turn off the electronic component 300. If the user has actuated the ON/OFF button, the operation terminates, but if not, the operation proceeds to a block 406 in which electronic component 300 monitors switch unit 310 for an output signal that indicates that a user has actuated a button. In one embodiment of block 406, each button, when actuated, provides an output signal to personalization unit 312. In another embodiment, each button provides an output signal to CPU 335 of mobile communication device 138, and, in response, CPU 335 executes instructions to perform the indicated operation. In this embodiment, in response to receiving an output signal from switch unit 310, CPU 335 accesses corresponding personalization data. CPU 335 may access the personalization data from personalization unit 312 or it may access personalization data in mobile communication device 138 that has previously been transferred from personalization unit 312.

In a decision block 410, personalization unit 312 detects whether a button has been actuated. In one embodiment, a button actuation is detected when an output signal from switch unit 310 is detected. In this embodiment, if personalization unit 312 does not detect a button actuation, the operation loops back to block 405. In an alternative embodiment, the operation may loop back to block 406 instead. However, if in block 410 personalization unit 312 does detect a button actuation, the operation proceeds to a block 412.

In block 412, personalization unit 312 accesses personalization information (stored in personalization unit 312) corresponding to the button actuation. For example, the actuated key may have been preconfigured to start the process of playing a music data file. Thus, in this example, the actuated button generates a signal that is interpreted by personalization unit 312 to access the music data file, which is stored in personalization unit 312.

In an alternative embodiment, during block 404, personalization unit 312 may download the personalization information to mobile electronic communication device 138 as part of the handshaking or initialization operation. Mobile electronic communication device 138 then stores the personalization information in memory 336. Then in block 412, personalization unit 312 sends a command to mobile electronic communication device 138 to access personalization information stored in memory 336. In an alternative embodiment for use when mobile electronic communication device 138 includes SIM 340, personalization information may be stored in SIM 340 in addition to or instead of memory 336.

In a block 414, the personalization further processes the accessed personalized information. For example, in one embodiment, personalization unit 312 sends the accessed personalized information to mobile electronic communication device 138 via interface unit 314. Mobile electronic communication device 138 then processes this information to perform a preprogrammed function or operation.

For example, the personalized information may include a music data file and a command to play the music data file. In response, mobile electronic communication device 138 could play the music data file using audio unit 331 and a software music player implemented by CPU 335 and memory 336. In another example, the personalized information may be a graphics, animated graphic, video data file etc. to be presented via display 330 and/or audio unit 331 when executed by a software media player implemented in mobile electronic communication device 138. In yet another example, the personalized information may include a telephone number, email message, SMS message etc. that mobile electronic communication device 138 would dial or execute via RF unit 332.

Similarly, the personalized information may include a URL, email box, etc. from which mobile electronic communication device 138 would retrieve desired information via RF unit 332. In addition, the personalized information may include security information (e.g., passwords, codes, keys, etc.), file names, and/or address specifications designating locations on a network for accessing and retrieving data. In still other embodiments, the personalized information may include various combinations of the above-described types of information to be performed by mobile electronic communication device 138.

In a further refinement, the processing of block 414 may include further user input via the user interface (which can include a microphone (not shown), display 330, and keypad 333) of mobile electronic communication device 138. For example, the personalized information may include a URL of a web page that will be displayed on display 330. The user can then navigate the web page via keypad 333.

In an alternative embodiment, the personalized information accessed by personalization unit 312 can be processed independently from mobile communication electronics 320 of mobile electronic communication device 138. For example, electronic component 300 of interchangeable covering 100 may include a simple audio unit (not shown) that can play an audio file. Thus, in this embodiment, a user can, for example, play a sound effect, song, voice sample, etc. without using the electronics of mobile electronic communication device 138. In another embodiment, electronic component 300 can selectively process the accessed information independently from mobile electronic communication device 138 or send the accessed information to mobile electronic communication device 138 to be processed as described in the previous paragraph.

Figure 4:
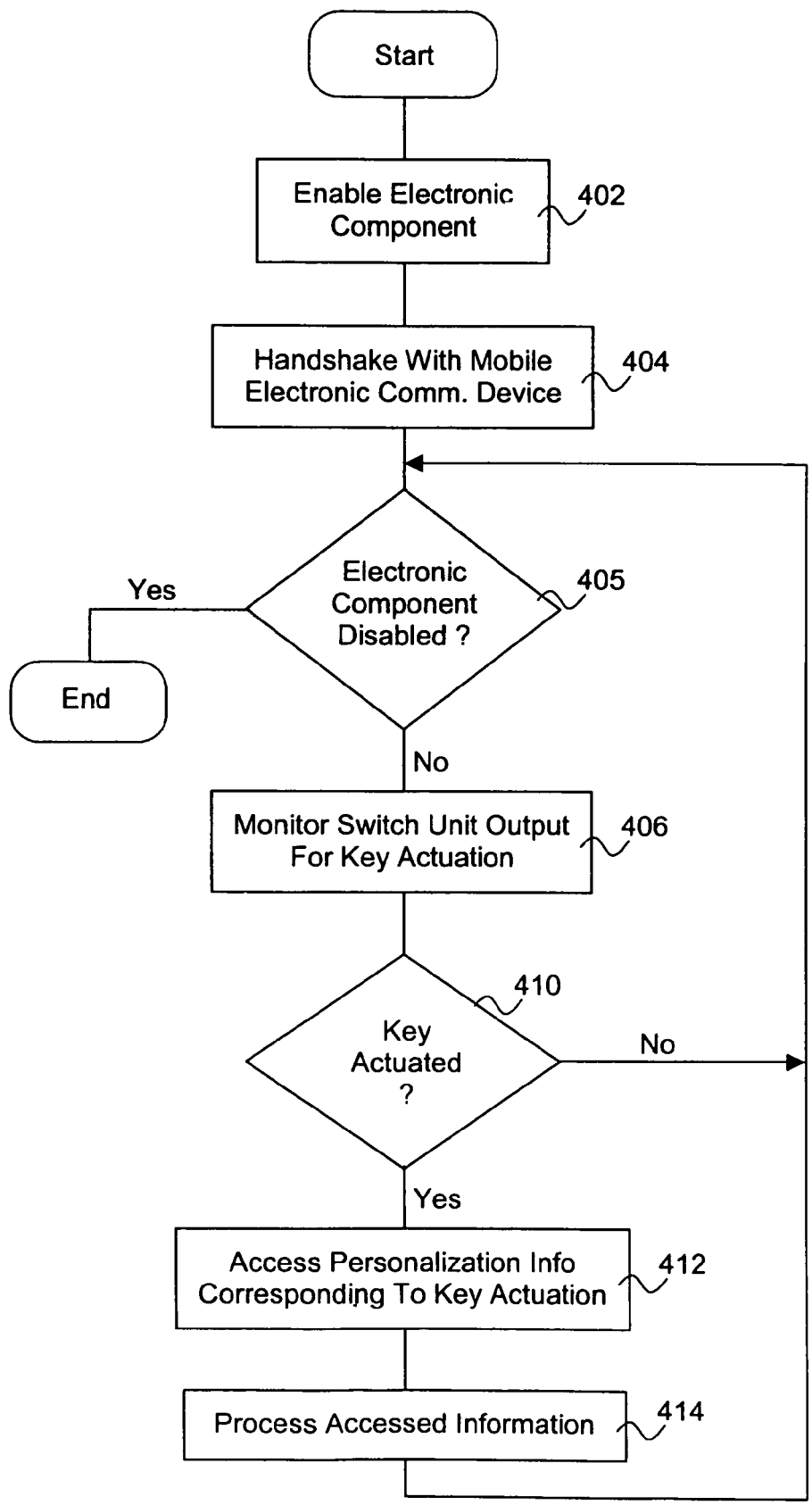
FIG. 4 is a flow diagram illustrating the operation flow of the electronic component depicted in FIG. 3, according to one embodiment of the present invention.

Although the blocks of FIG. 4 are described in a specified order, in view of the present disclosure, those skilled in the art can change the order to implement other embodiments of the present invention without undue experimentation.

Figure 5:
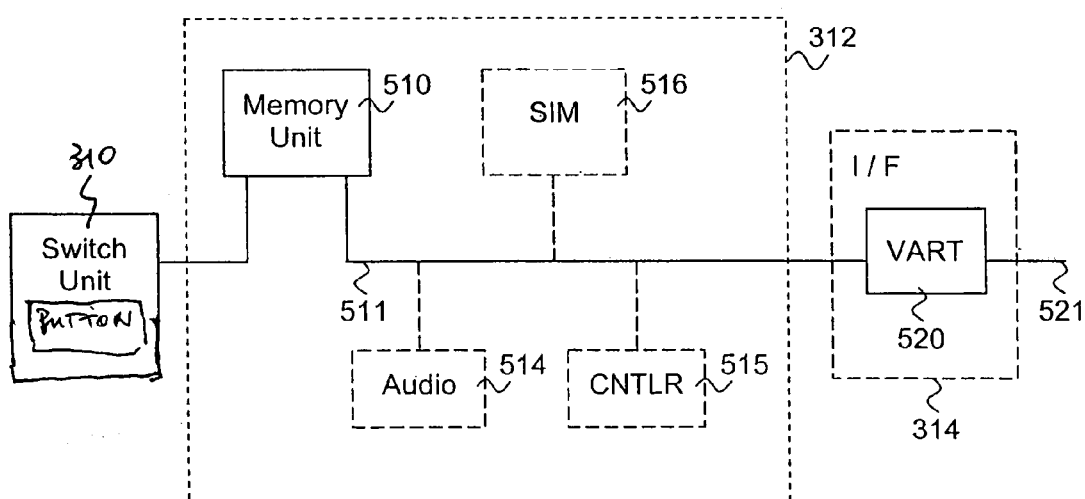
FIG. 5 is a simplified block diagram illustrating in more detail the personalization unit depicted in FIG. 3, according to one embodiment of the present invention.

FIG. 5 illustrates personalization unit 312 (FIG. 3), according to one embodiment of the present invention. In this embodiment, personalization unit 312 includes a memory unit 510. Memory unit 510 in turn includes a memory array and associated addressing and control circuitry for accessing the memory array. In one embodiment, a signal from switch unit 310 can initiate the proper sequence of timing and control signals to access a preselected memory location or locations in the memory array and output information stored at these locations onto a bus 511. In this embodiment, interface unit 314 has its input port connected to bus 511 to receive information retrieved from memory unit 510.

In alternative embodiments, personalization unit 312 can include other elements such as, for example, an audio unit 514, a controller 515 or a SIM 516, which are illustrated in dashed lines to indicate that they are optional. In one embodiment, audio unit 514 can be used as described above for block 414 (FIG. 4). Controller 515 may be implemented with a microprocessor or microcontroller device configured to access memory unit 510 via bus 511. In embodiments containing controller 515, switch unit 310 may be connected to controller 515 instead of memory unit 510. In such embodiments, the signals from switch unit 310 may serve as interrupt signals for controller 515. Controller 515 is programmed to respond to these interrupts to perform the functions as described above in conjunction with block 414 (FIG. 4). SIM 516 could be a standard SIM to allow a user to move particular personalization information to another interchangeable covering as desired.

An implementation of interface unit 314 is also shown in FIG. 5. In this implementation, interface unit 314 includes a UART device 520 configured to receive personalization information from memory unit 510 via bus 511 and transmit this information to mobile electronic communication device 138 via a bus 521. Suitable UARTs are available from many commercial vendors.

Figure 6:
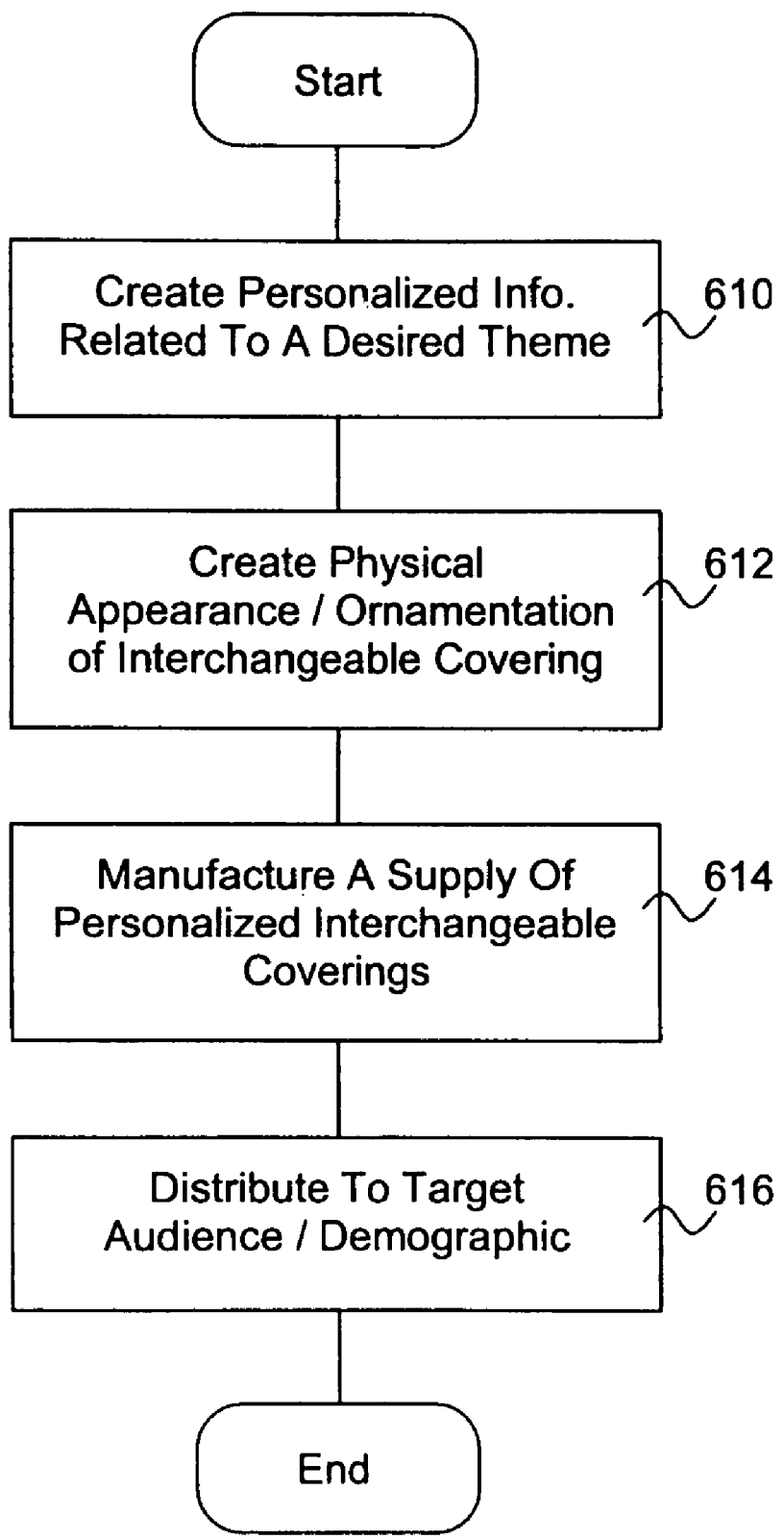
FIG. 6 is a flow diagram illustrating a business method using interchangeable coverings, according to one embodiment of the present invention.

FIG. 6 illustrates a business method using interchangeable coverings, according to one embodiment of the present invention. In one embodiment, the personalized information loaded in electronic component 300 (FIG. 3) includes information that is related to a selected theme, event, activity, business, promotion, product, etc. For example, a television network may sponsor or distribute interchangeable coverings loaded with information such as the television network's channel in the local area, new shows, upcoming episodes of particular shows, contests, merchandise, music samples, video samples, animations, information hotlines, etc. that are related to the television network's business and programming.

In a block 610, the entity practicing the method creates personalized information related to a desired theme. For example, a radio station may want to use the method with a theme related to an upcoming event sponsored by the radio station. In this example, the radio station may create personalized information such as the radio station's channel (i.e., frequency), upcoming concerts, contests, merchandise, music samples, video samples, animations, information hotlines, etc. that are related to the radio station's business and music format.

In a block 612, the entity practicing the method also creates a design for the physical appearance of interchangeable covering 100 (FIG. 1). For example, the entity may design the interchangeable covering to have multiple colors in a specific design, logos of advertisers, images of performers, objects or other graphical designs, a specific texture or contours, etc. In some embodiments, the interchangeable coverings display text and/or images (e.g., likenesses of performing artists, logos of sponsors, etc.) on the face of the buttons on the interchangeable coverings. Although listed sequentially, blocks 610 and 612 may be performed in a different order or concurrently.

In a block 614, the entity practicing the method manufactures a suitable number of interchangeable coverings personalized according to blocks 610 and 612. In one embodiment, large quantities of interchangeable coverings are manufactured to reduce the per item costs.

In a block 616, the personalized interchangeable coverings are distributed to the target audience or demographic. For example, the entity may pass out interchangeable coverings free to concertgoers as they enter a venue. The cost of the interchangeable coverings may be viewed as advertising/promotional costs, and can be defrayed by advertisers or sponsors. For example, advertisers may be required to pay a fee to have their logos displayed on the interchangeable covering. Of course, the entity may choose to sell the interchangeable coverings to consumers who wish to purchase the interchangeable covering for the appearance of and/or personalized information in the interchangeable covering.

In a block 618, the entity can track usage of the interchangeable coverings. For example, as previously described, the interchangeable coverings may include personalization information such as URLs, telephone numbers, email address, purchasing/ordering information, and other external links that users can execute after attaching the interchangeable coverings to their mobile electronic communication devices. The entity can, for example, count the number of visits to a web site, the number of calls to a telephone number, the number of sale of particular merchandise, the number of emails to a particular address, etc. In this way, the entity may collect valuable marketing information that the entity can use to design future marketing campaigns, set advertising/sponsoring fees, etc.

Figure 7:
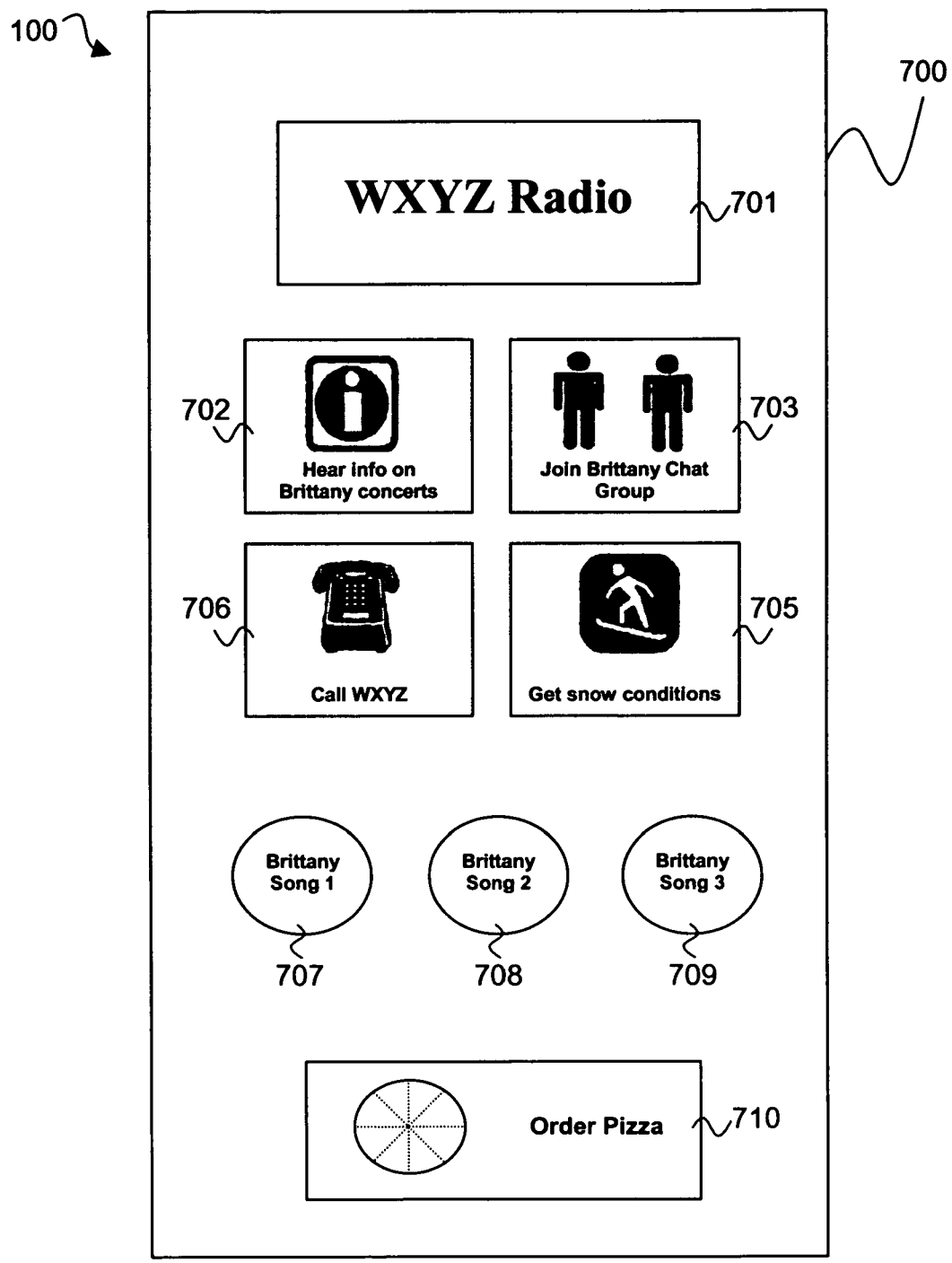
FIG. 7 is a diagram illustrating an interchangeable covering, according to another embodiment of the present invention.

FIG. 7 illustrates a face 700 of interchangeable covering 100, according to one embodiment of the present invention. This embodiment of interchangeable covering 100 is fitted to mobile electronic communication device (not shown) so that face 700 is on the backside of the mobile electronic device.

In this embodiment, the interchangeable covering 100 is implemented as an elastomeric covering appropriate openings on the "front side" for the keys and display of the mobile electronic device. In addition, this embodiment includes buttons 701–710. In one embodiment, buttons 701–710 are implemented using a relatively thin membrane keypad, which are commercially available. In addition, the buttons are labeled using graphics that are related to a theme, as described above in conjunction with FIG. 6. Thus, in this exemplary embodiment (which continues with the radio station example above), button 701 is labeled with the stylized call letters of the sponsoring radio station. Pressing button 701 causes the mobile electronic communication device to receive the broadcast from that radio station. In this example, button 702 is labeled with a graphic with the international "information" symbol and the text "hear info on concerts." Pressing button 702 causes the mobile electronic communication device to receive information related to concerts by the performing artist. Button 703 is labeled with a graphic of two people and the text "join chat group." Pressing button 703 causes the mobile electronic communication device to connect to a chat group. Similarly, buttons 705–710 are labeled with graphics indicating features such as dialing the telephone number of the sponsoring radio station, getting snow conditions, playing songs or music samples by the performing artist or placing an order with a sponsor for merchandise or products (e.g., pizza).

Other examples include buttons for sending email to the performing artist; "voting" buttons that users may be asked to use in response to announcements given during a concert, buttons that visit a website with information about the performing artist, products, sponsors and other theme-related information.

This embodiment advantageously provides, in effect, an "icon" or "shortcut" that allows users to easily learn what personalization information is stored in the interchangeable covering and to easily access or use desired personalization information. In addition, the graphics on the buttons sufficiently explain the function invoked by the button so that there is no need for the user to view the display of the mobile electronic communication device to properly invoke the feature. Thus, this embodiment of interchangeable covering 100 remains easy to operate even though buttons 701–710 are located on the back side of mobile electronic communication device.

Although the entity practicing the invention is described as performing the creating, manufacturing and distribution operations in blocks 610, 612, 614, 616 and 618, it is understood that outside contractors, manufacturers, consultants, etc. hired by the entity are also meant to be included.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An interchangeable covering for use with a mobile electronic communication device, the interchangeable covering comprising:
   an electronic component, comprising:
      a switch unit having a button, wherein the button is actuatable by a user of the mobile electronic device when the interchangeable covering is attached to the mobile electronic communication device;
      a personalization unit coupled to the switch unit, wherein the personalization unit is configured to store personalized information and to access the personalized information in response to an actuation of the button of the switch unit; and
      an interface unit coupled to the personalization unit, the interface unit being configured to electrically connect the electronic component to the mobile electronic communication device when the interchangeable covering is attached to the mobile electronic communication device.

2. The interchangeable covering of claim 1, wherein the electronic component is configurable to provide personalization information to the mobile electronic communication device through the interface unit.

3. The interchangeable covering of claim 1, wherein the switch unit comprises a plurality of buttons, the plurality of buttons being actuatable by the user when the interchangeable covering is attached to the mobile electronic communication device.

4. The interchangeable covering of claim 1, wherein the personalization unit is embedded within the interchangeable covering.

5. The interchangeable covering of claim 1, wherein the personalization unit is mounted on a surface of the interchangeable covering.

6. The interchangeable covering of claim 1, wherein the interface unit comprises a universal asynchronous receiver/transmitter (UART).

7. The interchangeable covering of claim 1, wherein the personalization information includes at least one of a music data file, a video data file, a telephone number, an email address, a universal resource locator (URL), a radio station identifier, a television station identifier, or a text file.

8. The interchangeable covering of claim 1, wherein the personalization information includes a command configured to cause the mobile electronic communication device to perform an operation specified by the command.

9. The interchangeable covering of claim 1, wherein the interchangeable covering comprises a rigid member.

10. The interchangeable covering of claim 1, wherein the interchangeable covering comprises an elastomeric covering.

11. The interchangeable covering of claim 1, wherein the personalization unit comprises a memory unit,.

12. The interchangeable covering of claim 11, wherein the personalization unit further comprises a controller coupled to the memory unit.

13. The interchangeable covering of claim 1, wherein the personalization unit is configured to provide the personalization information to the mobile electronic communication device during and initialization operation.

14. The interchangeable covering of claim 1, wherein the personalization unit is configured to provide a portion of the personalization information to the mobile electronic communication device in response to a button actuation.

15. An interchangeable covering for use with a mobile electronic communication device, the interchangeable covering comprising:
   an electronic component, comprising:
      switch means for initiating an accessing operation, wherein the switch means includes a button that is actuatable by a user of the mobile electronic device when the interchangeable covering is attached to the mobile electronic communication device;
      personalization means for storing personalized information and for accessing the personalized information in response to an actuation of the button of the switch means; and
      interface means for electrically connecting the electronic component to the mobile electronic communication device when the interchangeable covering is attached to the mobile electronic communication device.

16. The interchangeable covering of claim 15, wherein in response to an actuation of the button the personalization means provides personalization information to the mobile electronic communication device through the interface means.

17. The interchangeable covering of claim 15, wherein the personalization means provides a portion of the personalization information to the mobile electronic communication device through the interface means during an initialization period.

18. The interchangeable covering of claim 15, wherein the personalization information includes at least one of a music data file, a video data file, a telephone number, an email address, a universal resource locator (URL), a radio station identifier, a television station identifier, or a text file.

19. The interchangeable covering of claim 15, wherein the personalization means provides the personalization information to the mobile electronic communication device during an initialization operation.

20. The interchangeable covering of claim 19, wherein in response to a button actuation the personalization means causes the mobile electronic communication device to access the personalized information stored in the mobile electronic communication device.

21. The interchangeable covering of claim 15, wherein the personalization means provides a portion of the personalization information to the mobile electronic communication device in response to a button actuation.

22. A method, comprising:
   enabling an electronic component of an interchangeable covering after the interchangeable covering is attached and electrically connected via an interface unit to a mobile electronic communication device, the electronic component storing personalization information in a personalization unit;
   determining whether a button of the electronic component has been actuated by a user;
   accessing personalization information in response to the button of a switch unit actuation; and
   processing the accessed information.

23. The method of claim 22, wherein processing the accessed information further comprises receiving information inputted via the mobile electronic communication device.

24. The method of claim 23, wherein the received information is inputted by a user via a keypad of the mobile electronic communication device.

25. The method of claim 22, wherein the information includes at least one of a music data file, a video data file, a telephone number, an email address, a universal resource locator (URL), a radio station identifier, a television station identifier, or a text file.

26. The method of claim 22, wherein processing the accessed information includes providing information to the mobile electronic communication device.

27. The method of claim 26, wherein the information provided to the mobile electronic communication device includes a command configured to cause the mobile electronic communication device to perform an operation specified by the command.

28. The method of claim 22, wherein accessing information further comprises providing a portion of the personalization information to the mobile electronic communication device in response to the actuation of the button.

29. The method of claim 22, further comprising providing the personalization information to the mobile electronic communication device during an initialization operation.

30. An interchangeable covering for use with a mobile electronic communication device, the interchangeable covering comprising:
an electronic component having a button accessible to a user after the covering is attached to a mobile electronic communication device, the electronic component storing personalization information;
means for enabling the electronic component responsive to activation of the button by a user, after the interchangeable covering is attached to a mobile electronic communication device;
means for determining, after the interchangeable covering is attached to a mobile electronic communication device, whether the button of the electronic component has been actuated by a user;
means for accessing personalization information if the button has been actuated by a user after the interchangeable covering is attached to a mobile electronic communication device; and
means for processing the accessed information.

31. The interchangeable covering of claim 30, wherein the means for processing the accessed information is further configured to receive information inputted via the mobile electronic communication device.

32. The interchangeable covering of claim 31, wherein the received information is inputted by a user via a keypad of the mobile electronic communication device.

33. The interchangeable covering of claim 30, wherein the personalization information includes at least one of a music data file, a video data file, a telephone number, an email address, a universal resource locator (URL), a radio station identifier, a television station identifier, or a text file.

34. The interchangeable covering of claim 30, wherein the means for processing provides information to the mobile electronic communication device.

35. The interchangeable covering of claim 34, wherein the information provided to the mobile electronic communication device includes a command configured to cause the mobile electronic communication device to perform an operation specified by the command.

36. The interchangeable covering of claim 30, wherein the means for accessing provides the personalization information to the mobile electronic communication device during an initialization operation.

37. The interchangeable covering of claim 36, wherein in response to the button actuation the means for accessing causes the mobile electronic communication device to access the personalized information stored in the mobile electronic communication device.

38. A method, comprising:
creating personalized information related to a desired theme;
obtaining a plurality of interchangeable coverings, each interchangeable covering being configured for use with a mobile electronic communication device and including a button to be actuated by a user to activate application of the personalized information;
loading the personalized information into each of the interchangeable coverings of the plurality of interchangeable coverings; and
distributing the plurality of interchangeable coverings to a selected group of people.

39. The method of claim 38, further comprising tracking usage of the plurality of interchangeable coverings.

40. The method of claim 38, wherein the personalization information includes at least one of a music data file, a video data file, a telephone number, an email address, a universal resource locator (URL), a radio station identifier, a television station identifier, or a text file.

41. The method of claim 38, wherein each interchangeable covering of the plurality of interchangeable coverings is configurable to provide at least a portion of the loaded personalized information to a mobile electronic communication device when the interchangeable covering is attached to the mobile electronic communication device.

42. The method of claim 41, wherein the portion of loaded personalized information includes a command configured to cause the mobile electronic communication device to perform an operation specified by the command.

43. The method of claim 42, further comprising counting the number of times the operation is performed.

44. The method of claim 38, wherein the interchangeable covering includes an electronic component comprising:
a switch unit having a button, wherein the button is actuatable by a user of the mobile electronic device when the interchangeable covering is attached to the mobile electronic communication device;
a personalization unit coupled to the switch unit, wherein the personalization unit is configured to store the personalized information and to access the personalized information in response to an actuation of the button of the switch unit; and
an interface unit coupled to the personalization unit, the interface unit being configured to electrically connect the electronic component to the mobile electronic communication device when the interchangeable covering is attached to the mobile electronic communication device.

45. The method of claim 44, wherein the personalization unit of each interchangeable covering of the plurality of interchangeable coverings is embedded in the interchangeable covering.

46. The method of claim 38, wherein the theme comprises a marketing campaign.

47. The method of claim 46, wherein the marketing campaign is for a performance event.

48. A covering for a mobile electronic communication device, the mobile electronic communication device including a plurality of keys, the covering comprising:
a plurality of fittings, each fitting of the plurality of fittings being associated with a corresponding key of the plurality of keys, wherein at least one of the keys is positioned on the back side of the mobile electronic communication device when the covering is attached to the mobile electronic communication device, to facilitate activation of application of personalized information;

an interchangeable portion, comprising:
- a switch unit having a button, wherein the button is actuatable by a user of the mobile electronic device when the covering is attached to the mobile electronic communication device;
- a personalization unit coupled to the switch unit, wherein the personalization unit is configured to store personalized information and to access the personalized information in response to an actuation of the button of the switch unit; and
- an interface coupled to the personalization unit, the interface unit being configured to electrically connect the personalization unit and the switch unit to the mobile electronic communication device when the covering is attached to the mobile electronic communication device.

49. A method of operating a mobile electronic communication device having a first input key on the back of the device, integrated with a cover of the device, and a second input key on the front of the device, exposed by the cover of the device, the method comprising:
- determining whether the first input key integrated with the cover of the device has been activated by a user, the first input key indicative of a desired operation;
- in response to the first input key activation, prompting the user for input on the second input key exposed by the cover of the device; and
- in response to the input on the second input key, performing the desired operation.

50. The method of claim 49, wherein the desired operation is an operation selected from the group consisting of playing an audio data file, tuning to a radio frequency, tuning to a television channel, sending a text message, and retrieving information from a remote server.

* * * * *